US010668530B2

(12) United States Patent
Barge et al.

(10) Patent No.: US 10,668,530 B2
(45) Date of Patent: Jun. 2, 2020

(54) APPARATUS FOR MOULDING BATTERY COMPONENTS

(71) Applicant: TBS ENGINEERING LIMITED, Cheltenham (GB)

(72) Inventors: Chris Barge, Cheltenham (GB); Simon Britton, Cheltenham (GB)

(73) Assignee: TBS ENGINEERING LIMITED, Gloucester (GB)

( * ) Notice: Subject to any disclaimer, the term of this patent is extended or adjusted under 35 U.S.C. 154(b) by 304 days.

(21) Appl. No.: 15/520,264

(22) PCT Filed: Oct. 14, 2015

(86) PCT No.: PCT/GB2015/053047
§ 371 (c)(1),
(2) Date: Apr. 19, 2017

(87) PCT Pub. No.: WO2016/063012
PCT Pub. Date: Apr. 28, 2016

(65) Prior Publication Data
US 2018/0311725 A1    Nov. 1, 2018

(30) Foreign Application Priority Data
Oct. 20, 2014 (GB) .................................. 1418628.2

(51) Int. Cl.
*B22D 39/02* (2006.01)
*B22D 25/04* (2006.01)
(Continued)

(52) U.S. Cl.
CPC ............. *B22D 39/02* (2013.01); *B22D 19/04* (2013.01); *B22D 25/04* (2013.01); *H01M 2/28* (2013.01); *H01M 2/302* (2013.01); *H01M 10/12* (2013.01)

(58) Field of Classification Search
CPC ........ B22D 19/04; B22D 25/04; B22D 35/02; B22D 35/04; B22D 39/02; B22C 9/06
(Continued)

(56) References Cited

U.S. PATENT DOCUMENTS

| 4,180,120 A | 12/1979 | Eberle |
| 2007/0295886 A1 | 12/2007 | Hopwood et al. |

FOREIGN PATENT DOCUMENTS

| CN | 87203301 U | 1/1988 |
| CN | 102126016 A | 7/2011 |

(Continued)

OTHER PUBLICATIONS

Search Report in GB Application No. 1418628.2 dated Feb. 25, 2015, 1 page.
(Continued)

*Primary Examiner* — Kevin P Kerns
(74) *Attorney, Agent, or Firm* — Marshall, Gerstein & Borun LLP (57) ABSTRACT

An apparatus and a method for moulding battery components using an apparatus include a mould block having a plurality of mould cavities; a molten metal feed trough adjacent to the mould block and extending in a generally longitudinal direction along the mould block; a plurality of weirs between the feed trough and each of the cavities; and a supply for providing molten metal to the trough. The feed trough is provided with at least one volume adjustment mechanism, which is operable to alter the volume of the feed trough.

14 Claims, 5 Drawing Sheets

(51) Int. Cl.
*B22D 19/04* (2006.01)
*H01M 2/28* (2006.01)
*H01M 2/30* (2006.01)
*H01M 10/12* (2006.01)

(58) Field of Classification Search
USPC ....... 164/129, 130, 322, 108, 109, 110, 332, 164/333, 334, 133, 337; 249/82, 83
See application file for complete search history.

(56) References Cited

FOREIGN PATENT DOCUMENTS

| | | |
|---|---|---|
| CN | 103817311 A | 5/2014 |
| CN | 203679238 U | 7/2014 |
| EP | 0250830 A2 | 1/1988 |
| EP | 1884302 A2 | 2/2008 |
| GB | 2507485 A | 5/2014 |
| JP | 09-174226 | 7/1997 |
| JP | 2006021240 A | 1/2006 |
| WO | WO-91/05625 A1 | 5/1991 |
| WO | WO-94/16466 A1 | 7/1994 |
| WO | WO-2006/006430 A1 | 1/2006 |

OTHER PUBLICATIONS

International Search Report and Written Opinion in International Application No. PCT/GB2015/053047 dated Jan. 15, 2016, 14 pages.

Chinese Office Action for application No. 201580056933.5, dated Aug. 29, 2018.

APPARATUS FOR MOULDING BATTERY COMPONENTS

FIELD OF THE INVENTION

The present invention relates to an apparatus for moulding battery components and a method of moulding battery components.

BACKGROUND OF THE INVENTION

The term "battery" is used herein to include accumulators. In a conventional lead-acid battery it is customary to connect together the plates of each stack by means of a lead strap or post which is fixed to aligned lugs or tabs on the plates.

In the manufacture of batteries, particularly for example lead acid batteries, it is known to cast battery components. Components such as straps and other formations can also be simultaneously cast onto the lugs of battery plates so as to, for example, form a connection between a set of plates within a cell of the battery. Such straps are generally cast by filling a mould cavity with lead and dipping lugs into the cavity prior to the cooling of the lead. Typically, the mould cavities are filled by allowing lead to flow into channels at the sides of the cavities and spill over a weir into the mould.

An example of a typical casting apparatus is shown in the Applicant's earlier application WO94/16466 in which the apparatus includes a mould having a set of post or strap mould cavities, a molten metal feed duct adjacent thereto, a weir between the feed duct and the cavities, means for supplying molten lead to the duct, and hence the cavities, a pump and at least a pair of substantially parallel feed passages extending below the duct and connected to the duct.

It is important that the flow of lead into all of the mould cavities is carefully controlled during the casting of components. Ideally the flow of molten lead should be balanced or controlled along the length of the mould trough so that all the cavities fill at the same time and at the same rate. Such balancing of the flow is difficult to achieve with existing apparatuses and may for example be effected by manufacturing tolerances and operating conditions in the mould and/or supply.

A further complication arises, when left and right sets of mould cavities are provided, each having an adjacent feed duct and associated feed passages. In this case it desirable that the flow of molten lead is balanced between the left and right sides.

The applicant has previously attempted to address the problem of left and right side flow control (or left and right flow balancing) by providing a throttle bolt in either the left or the right feed passage at the pump end. The throttle bolt can be adjusted to alter the flow rate of the molten metal through the passage to ensure that the left and right mould cavities are filled at an even rate.

A further possible solution to the problem of balancing the flow of molten metal is to provide multiple supply pumps and inlets, and to regulate each individually. However, this increases the complexity and cost of the apparatus.

Embodiments of the invention seek to provide an apparatus which may provide improved delivery of lead to the mould cavities.

SUMMARY OF INVENTION

According to a first aspect of the present invention there is provided an apparatus for moulding battery components including:

a mould block having a plurality of mould cavities;

a molten metal feed trough adjacent to the mould block and extending in a generally longitudinal direction along the mould block;

a plurality of weirs between the feed trough and each of the cavities; and a supply for providing molten metal to the trough;

wherein the feed trough is provided with at least one volume adjustment mechanism, which is operable to alter the volume of the feed trough.

The applicants have found that such an arrangement provides a simple and convenient means of balancing the flow through the feed trough and over the weirs into the cavities. As the troughs are at the upper surface of the mould (and are generally open) the adjustment mechanism may be easily accessed and its position viewed by the user (in contrast to throttle bolt arrangements which act internally within the mould). The feed trough may include a first end; a second end and a central portion. The plurality of weirs may be provided along the central portion.

Typically two volume adjustment mechanisms may be provided, one at each end of the feed trough. The volume adjustment mechanisms may be independently adjustable. As such the apparatus may allow control/adjustment of the flow along the length of the trough.

The, or each, volume adjustment mechanism may be arranged to be adjusted between a plurality of indexed positions. For example the adjustment mechanism may include an element which can be secured in at least two discrete positions within the feed trough. The index positions may provide physical alignment. Additionally, the index may provide a convenient visual representation of the selected position for the end user.

The, or each, volume adjustment mechanism may be arranged to provide an adjustable position end wall of the trough in use. The end wall may effectively adjust the length of the trough in use.

The, or each, volume adjustment mechanism may comprise an element which is arranged to be received within the feed trough. The element may, for example, have a lower profile which is shaped and configured to match the shape and configuration of the trough.

The, or each, element may be arranged to be longitudinally moveable within the feed trough. For example the element may be slideable within the feed trough. Alternatively, the element may be positionable in a series of longitudinal positions within the trough.

The, or each, volume adjustment mechanism may further comprise a locking member arranged to secure the element in position.

The, or each, element may be provided with a plurality of features to be engaged by the locking member. The features may for example be a plurality of notches or recesses (into which the locking member may for example be received). The notches or recesses may be defined by castellations along the upper surface of the element.

The supply may comprise a feed passage extending below the feed trough. The supply may further comprise a plurality of substantially vertically extending passages connecting the feed passage to the feed trough. The supply may further comprise a supply pump inlet in fluid communication with the feed passage, for connection to a pump supplying molten metal.

The feed passage may comprise an inner feed passage extending below the feed trough and connected to the feed trough. The feed passages may also comprise an outer feed passage extending substantially parallel to the inner feed passage, the supply pump inlet being in fluid communication with the outer feed passage. At least one connection passage may be provided leading from the outer feed passage to the inner feed passage.

Typically, the apparatus may extend longitudinally and the supply pump is provided at one end of the apparatus.

The apparatus may include a second mould block, provided adjacent and parallel to the first mould block, the second mould block having a plurality of mould cavities.

A second molten metal feed trough may be provided adjacent to the second mould block and extending along the length of the mould block. A plurality of weirs may extend between the second feed trough and each of the cavities. A second supply may be arranged for providing molten metal to the second trough. The second feed trough may be provided with at least one volume adjustment mechanism, which is operable to alter the volume of the second feed trough.

The second supply may comprise a second feed passage extending below the second feed trough. The second supply may further comprise a plurality of substantially vertically extending passages connecting the second feed passage to the second feed trough. The second supply may further comprise a supply pump inlet. The first and second supply may be connected to a common inlet.

The second feed trough may include volume adjustment mechanism having any of the features described above.

Two further volume adjustment mechanisms may be provided, one at each end of the second feed trough. The volume adjustment mechanisms may be independently adjustable.

According to a further aspect of the present invention, there is provided a method of moulding battery components including providing an apparatus for moulding battery components including: a mould block having a plurality of mould cavities; a molten metal feed trough adjacent to the mould block and extending along the length of the mould block; a plurality of weirs between the feed trough and each of the cavities;

providing a supply arrangement for supplying molten metal into the feed trough;

adjusting the volume adjustment mechanism to alter the volume of the feed trough so that the molten metal flows over the weirs into the plurality of mould cavities simultaneously.

The step of adjusting the volume may include moving volume adjustment mechanisms at one or both ends of the feed trough. The volume adjustment mechanisms may be adjusted to order to balance the flow of molten metal into the cavities along the length of the mould block.

The step of adjusting the volume may include moving volume adjustment mechanisms at one or both ends of the left and right feed troughs in order to balance the flow of molten metal into the cavities along the length of the both the left and the right mould blocks.

According to a further aspect of the invention, there is provided an apparatus for moulding battery components substantially as described herein.

According to a further aspect of the invention, there is provided a method of moulding battery components substantially as described herein.

Whilst the invention has been described above, it extends to any inventive combination of features set out above or in the following description or drawings.

BRIEF DESCRIPTION OF THE DRAWINGS

Specific embodiments of the invention will now be described in detail by way of example only and with reference to the accompanying drawings in which.

DESCRIPTION OF AN EMBODIMENT

Figure 1:
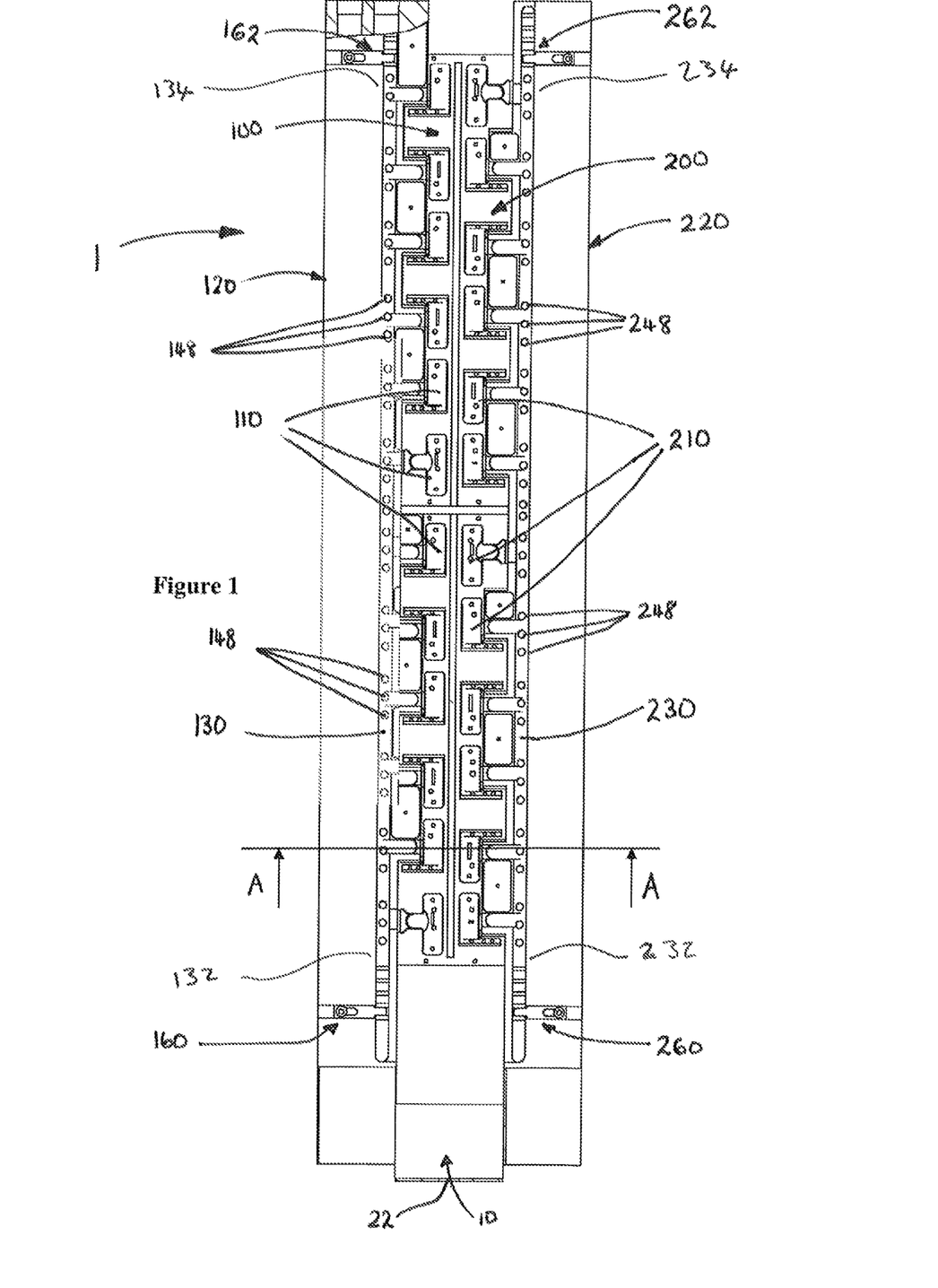
FIG. 1 is a schematic representation of a plan view of an apparatus according to an embodiment of the invention.

FIG. 1 shows a plan view of an apparatus 1 for moulding battery components according to an embodiment of the invention. The apparatus 1 includes a left (or first) mould block 100 and a right (or second) mould block 200. In this embodiment the left mould block 100 is integrally formed with the right mould block 200. However, the two mould blocks could also be formed separately.

A left support block 120 is secured to the left side of the left mould block 100; and a right support block 220 is secured to the right side of the right mould block 200.

Each mould block 100, 200 has a longitudinally extending form with several mould cavities 110, 210 provided along its length.

Left and right feed troughs 130, 230 extend longitudinally along the upper surface of the left and right support blocks 120, 220. The left and right feed troughs are positioned along the outer edge of the left and right mould blocks 100, 200. Each trough 130, 230 extends from a first end 132, 232 to a second end 134, 234. As best seen in the cross-section of FIG. 3 each trough 130, 230 has a radiused base 138, 238 and parallel spaced apart inner 135, 235 and outer 136, 236 side walls.

The left and right support blocks 120, 220 are joined at one end by a cross-member 10, the support blocks 120, 220 and cross member 10 thereby forming a u-shape when viewed from above. The cross-member 10 includes a T-connector 20 having an inlet 22 and two outlets 24, 26. In use, the inlet 22 is connected to a molten lead supply (not shown), which may include a pump assembly. A left outer feed passage 140 provided in the left support block 120 is in fluid connection with the left outlet or branch 24 of the T-connection. A right outer feed passage 240 provided in the right support block 220 is in fluid connection with the right branch 26 of the T-connector 20. The outer feed passages 140, 240 extend longitudinally in the support blocks along substantially the length of the apparatus 1, as can be seen from FIG. 2.

Figure 3:
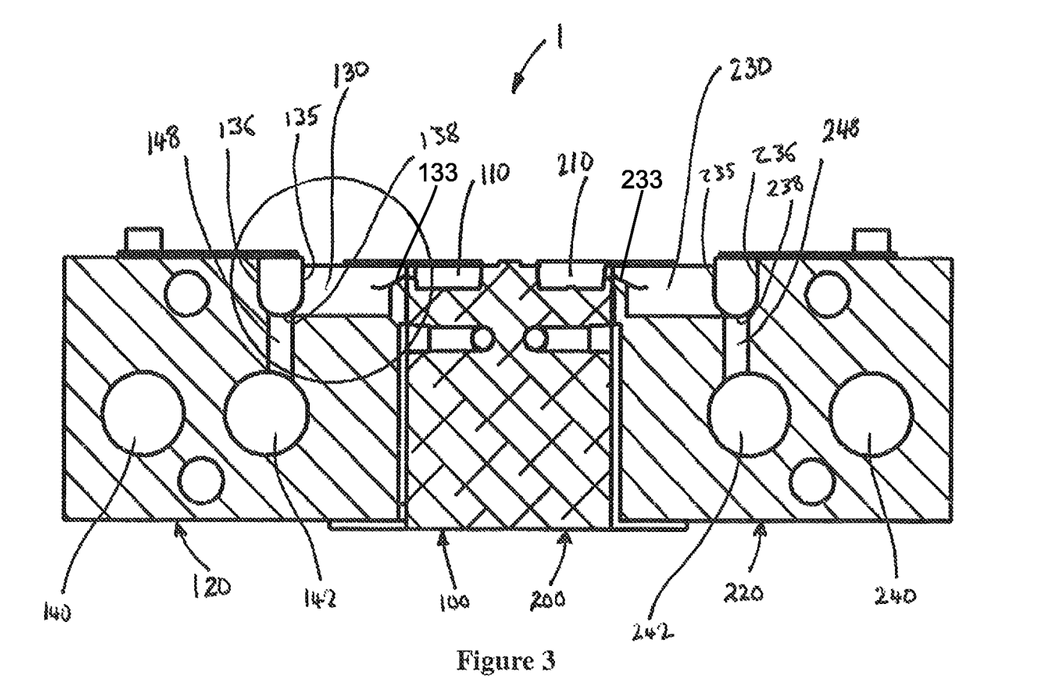
FIG. 3 is a cross-sectional view of the apparatus of FIG. 1, taken through line A.

As shown in FIG. 3, a left inner feed passage 142 is provided in the left support block 120 substantially parallel to the left outer feed passage 140. The left inner feed passage 142 extends longitudinally along the apparatus and is provided below the left feed trough 130. Similarly a right inner feed passage 242 is provided in the right support block 220, extending substantially parallel to the right outer feed passage 240 and below the right feed trough 230.

In the illustrated embodiment, the inner feed passages 142, 242 are initially formed to have a fluid connection to the right branch 26 of the T-connector, and this connection is blocked with a plug 144, 244. The left inner feed passage 142 and left outer feed passage 140 are fluidly connected at a mid point 146 as shown in the central cut-away section of FIG. 2. A similar fluid connection is provided between the right inner and outer feed passages 240, 242 at a mid-point 246.

The inner feed passages 142, 242 are connected to each respective feed trough 130, 230 by means of a plurality of substantially vertically extending passages 148, 248.

Figure 4:
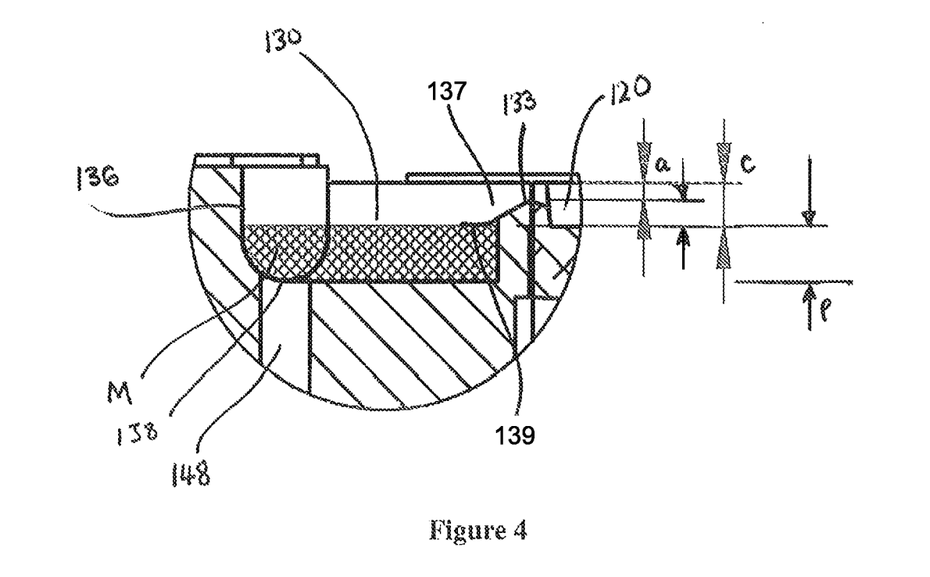
FIG. 4 is an expanded schematic representation of the highlighted area of FIG. 3.

Along the feed troughs 130, 230 narrow supply channels 137, 237 extend generally perpendicularly to the longitudinal direction from the inner side wall 135, 235 of the trough towards each mould cavity 110, 210. At the end of each supply channel 137, 237, and in alignment with the respective mould cavities 110, 210, is a weir 133, 233. FIG. 4 is an enlarged representation of a cross-sectional view of the area around one of the feed troughs 130. The feed trough 130 has an outer side wall 136 opposite the weir 133, and a base 138. At an outer edge of the channel 137 is a lip or overhang 139 which extends partially over the base of the supply channel.

The mould cavity 110 has a base 122, at a depth c below the weir 133. The depth of the feed trough 130 is greater than the depth of the mould cavity 110. FIG. 4 also shows the molten metal M at a pre-fill height p in the trough 130, which is significantly below the level of the weir 133.

The left feed trough 130 is provided a first volume adjustment mechanism 160 at the end 132 of the trough 130 which is closest to the pump inlet 22; and a second volume adjustment mechanism 162 at the other end 134 of the trough 130 (the end which is remote or distal from the pump inlet 22). Likewise, the right feed trough 230 is also provided with first and second volume adjustment mechanisms 260, 262 respectively positioned at the ends 232 and 234.

Figure 5:
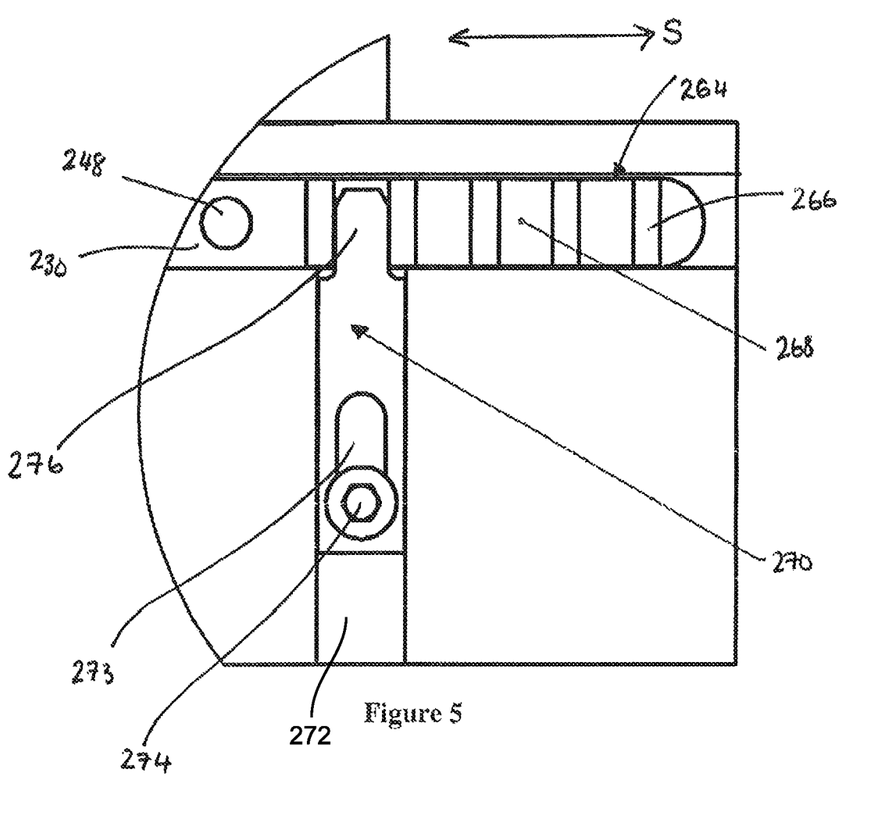
FIG. 5 is schematic representation of an adjustment mechanism according to the embodiment of FIG. 1.
Figure 6:
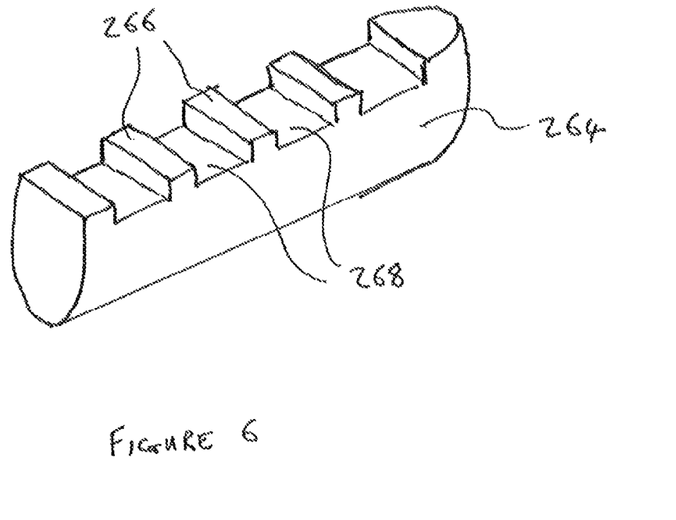
FIG. 6 is a schematic representation of an adjustment element for use in the embodiment of FIG. 1.

In the embodiment shown in the Figures, all of the volume adjustment mechanisms have the same structure, which will be described with regard to FIG. 5 which shows an enlarged view of the second volume adjustment mechanism 262 on the right feed trough 230 and FIG. 6 which shows an adjustment element 264 in isolation. However, it should be appreciated that all the other volume adjustment mechanisms have this structure.

The volume adjustment mechanism 262 includes a first element 264 which is arranged to be received within the feed trough 230. The lower profile of the element 264 is radiused and shaped and configured to match the profile of the trough 230. When positioned within the trough 230 the first element 264 is arranged to be slidable in a longitudinal direction S. A second element 270 is provided as a locking element which is operable to lock or secure the first element 264 in a desired position. As explained further below, when positioned within the feed trough 230 the elements of the volume adjustment 160, 162, 260, 262 act to define an end wall of the trough 130, 230.

In the embodiment shown, the first element 264 is provided with castellations 266 along its upper surface which define a series of notches or recesses 268. The second element 270 is arranged to engage the notches or recesses 268 so that the element 264 may be secured in a plurality of indexed positions within the trough 230. Conveniently, the second element 270 is slideably mounted in a recess 272 in the upper surface of the right support block 220. In the embodiment shown, the second element 270 is provided with a slot 273 though which a bolt 274 is inserted and screwed into a corresponding threaded hole (not shown) in the recess 272. The second element 270 has an inner end 276 which is configured to fit within the notches 268 on the first element 264. The second element 270 slides perpendicularly to the first element 264. To position and secure the volume adjustment mechanism 262, the first element 264 is slid in the feed trough 230 towards or away from the pump inlet 22 to the desired position. The second element 270 is then slid inwards until its inner end 276 engages with a notch 268 on the first element 264, and the bolt 274 is tightened to hold the second element 270 in place, thereby locking the first element 264 in position.

It will be appreciated that any other suitable mechanism could be used to secure the first element in a desired position. For example a second slideable element having an inner end with an engaging feature, and which is resiliently biased inwards to engage corresponding engaging features on the first element. Alternatively, a second element could be provided which is not slideable at all, but which is in some other way moveable, for example being pivotable, between a first position in which it locks and engages the first element and a second position in which the first element is freely slideable. The second element could also be removably, attached to the apparatus to engage and secure the first element.

In order to increase the volume of the feed trough 130, 230 at the pump inlet 22 end of the apparatus, the first volume adjustment mechanism 160, 260 is moved towards the pump inlet 22, thereby elongating the feed trough 130, 230. To decrease the volume of the feed trough 130, 230 at the pump inlet 22 end of apparatus, the first volume adjustment mechanism 160, 260 is moved away from the pump inlet 22, thereby shortening the feed trough 130, 230.

In order to increase the volume of the feed trough 130, 230 at the end of apparatus remote or distal from the pump inlet 22, the second volume adjustment mechanism 162, 262 is moved away from the pump inlet 22, thereby elongating the feed trough 130, 230. To decrease the volume of the feed trough 130, 230 at the end of apparatus remote or distal from the pump inlet 22, the second volume adjustment mechanism 162, 262 is moved towards the pump inlet 22, thereby shortening the feed trough 130, 230.

It will therefore be appreciated, that the volume adjustment mechanisms 160, 162, 260, 262 can be adjusted independently.

Figure 2:
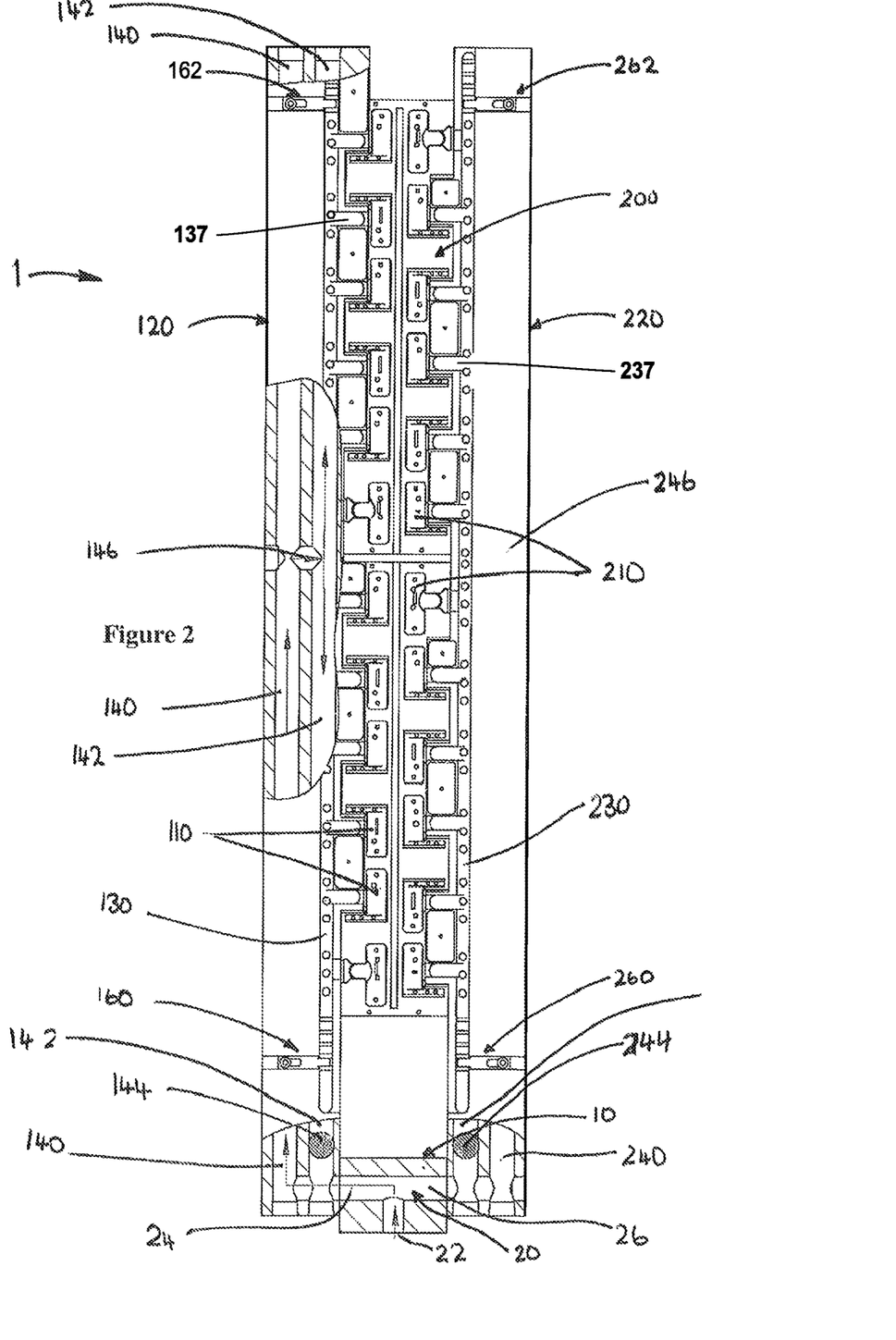
FIG. 2 is a schematic representation of FIG. 1 with cut-away sections showing internal components of the apparatus.

In FIGS. 1 and 2, the second volume adjustment mechanisms 162, 262 are in the position closest to the pump inlet 22 which means that there is a smaller volume for the molten metal to fill at this end of the feed troughs 130, 230. The first adjustment mechanisms 160, 260 are in the position closest to the pump inlet, which in this case means that a larger volume of molten metal is required to fill this end of the troughs 130, 230.

In use, a supply (not shown) is connected to the inlet 22, and is operated to pump molten metal, such as for example molten lead, into the apparatus 1 through the inlet 22. The molten metal flows through the T-branches 24, 26; along the outer feed passages 140, 240; through the mid-point connections 146, 246 and into the inner feed passages 142, 242. As the volume of molten metal in the apparatus increases, the molten metal rises up through the vertical passages 148, 248 and into the feed troughs 130, 230. As more molten metal flows into the apparatus 1, the level of molten metal M in the feed troughs 130, 230 rises. When the level of molten metal M in the trough rises above the uppermost point of the weir 133, 233, the metal flows over the weirs and into the cavities 110, 210.

To provide greater control of the filling process, the pump can be operated a first, slower speed until the molten metal in the feed troughs 130, 230 reaches a pre-fill height p (shown in FIG. 4). The pump then can be adjusted to maintain the pre-fill height of the molten level to allow the molten metal to reach a stable condition; this can be referred to as operating at the tick-over speed. The pump can then be operated at a faster speed to more rapidly increase the level of molten metal in the feed trough 130, 230 to a level a above the weir height (shown in FIG. 4) in order to fill the mould cavities 110, 210.

The volume adjustment mechanisms at both ends of the two feed troughs can be moved independently to adjust the volume of that portion of the feed trough (i.e. to extend or reduce the length of the trough at that end of the mould). This allows an operator to balance the flow of molten metal into the cavities along the length of the both mould blocks, so that all of the mould cavities are filled at the same time and at the same rate. The mould cavity fill process can therefore be controlled and balanced side-to-side as well as longitudinally.

While the invention has been described above with reference to one or more preferred embodiments, it will be appreciated that various changes or modifications may be made without departing from the scope of the invention as defined in the appended claims.

The invention claimed is:

1. An apparatus for moulding battery components comprising:
   a mould block having a plurality of mould cavities;
   a molten metal feed trough adjacent to the mould block and extending in a longitudinal direction along the mould block;
   a plurality of weirs between the feed trough and each of the cavities; and,
   a supply for providing molten metal to the feed trough, wherein the feed trough is provided with at least one volume adjustment mechanism, which is operable to alter a volume of the feed trough;
   wherein the at least one volume adjustment mechanism comprises an element which is arranged to be received within the feed trough; and
   wherein the at least one volume adjustment mechanism further comprises a locking member arranged to secure the element in position.

2. An apparatus according to claim 1, wherein the feed trough comprises a first end; a second end and a central portion, the plurality of weirs being provided along the central portion; and
   wherein two volume adjustment mechanisms are provided, one at each end of the feed trough, the volume adjustment mechanisms being independently adjustable.

3. An apparatus according to claim 1, wherein the at least one volume adjustment mechanism is arranged to be adjusted between a plurality of indexed positions.

4. An apparatus according to claim 1, wherein the at least one volume adjustment mechanism is arranged to provide an adjustable end wall which is used to adjust a length of the trough in use.

5. An apparatus as claimed in claim 1, wherein the element is longitudinally slideable within the feed trough.

6. An apparatus according to claim 1, wherein the element is provided with castellations along its upper surface which define a plurality of notches or recesses to be engaged by the locking member.

7. An apparatus according to claim 1, wherein the supply comprises:
   a feed passage extending below the feed trough;
   a plurality of substantially vertically extending passages connecting the feed passage to the feed trough; and
   a supply pump inlet in fluid communication with the feed passage, for connection to a pump supplying molten metal.

8. An apparatus according to claim 7, wherein the feed passage comprises:
   an inner feed passage extending below the feed trough and connected to the feed trough;
   an outer feed passage extending substantially parallel to the inner feed passage, the supply pump inlet being in fluid communication with the outer feed passage; and
   at least one connection passage leading from the outer feed passage to the inner feed passage.

9. An apparatus according to claim 1, wherein the apparatus extends longitudinally and a supply pump is provided at one end of the apparatus.

10. An apparatus according to claim 1, further comprising:
    a second mould block, provided adjacent and parallel to the first mould block, the second mould block having a plurality of mould cavities;
    a second molten metal feed trough adjacent to the second mould block and extending along the length of the second mould block;
    a plurality of weirs between the second feed trough and each of the cavities; and
    a second supply for providing molten metal to the second feed trough; and
    wherein the second feed trough is provided with at least one volume adjustment mechanism, which is operable to alter a volume of the second feed trough.

11. An apparatus according to claim 10, wherein two further volume adjustment mechanisms are provided, one at each end of the second feed trough, the volume adjustment mechanisms being independently adjustable.

12. A method of moulding battery components comprising:
    providing an apparatus for moulding battery components, the apparatus including:
       a mould block having a plurality of mould cavities;
       a molten metal feed trough adjacent to the mould block and extending in a longitudinal direction along the mould block; the feed trough being provided with at least one volume adjustment mechanism, which is operable to alter a volume of the feed trough; the at least one volume adjustment mechanism comprising an element which is arranged to be received within the feed trough, and a locking member arranged to secure the element in position; and,
       a plurality of weirs between the feed trough and each of the cavities;
    providing a supply arrangement for supplying molten metal into the feed trough; and, adjusting the at least one volume adjustment mechanism to alter the volume of the feed trough so that the molten metal flows over the weirs into the plurality of mould cavities simultaneously.

13. A method according to claim 12, wherein the at least one volume adjustment mechanism comprises a first volume adjustment mechanism at a first end of the feed trough and a second volume adjustment mechanism at a second end of the feed trough; and altering the volume of the feed trough includes moving at least one of the first volume adjustment mechanism and the second volume adjustment mechanism in order to balance the flow of molten metal into the cavities along a length of the mould block.

14. A method according to claim 12, wherein the apparatus further comprises:
- a left mould block having a left feed trough, the left feed trough having a first end and a second end;
- a right mould block having a right feed trough, the right feed trough having a first end and a second end; and,
- the at least one volume adjustment mechanism comprising a first volume adjustment mechanism located at the first end of the left feed trough and the first end of the right feed trough, and a second volume adjustment mechanism located at the second end of the left feed trough and the second end of the right feed trough,
- wherein altering the volume of the left feed trough includes moving at least one of the first volume adjustment mechanism at the first end and the second volume adjustment mechanism at the second end, and altering the volume of the right feed trough includes moving at least one of the first volume adjustment mechanism at the first end and the second volume adjustment mechanism at the second end, in order to balance the flow of molten metal into the cavities along a length of the left mould block and a length of the right mould block respectively.

* * * * *